US010445091B1

(12) United States Patent
Feero (10) Patent No.: US 10,445,091 B1
(45) Date of Patent: Oct. 15, 2019

(54) ORDERING INSTRUCTIONS IN A PROCESSING CORE INSTRUCTION BUFFER (71) Applicant: Apple Inc., Cupertino, CA (US)

(72) Inventor: Brett S. Feero, Austin, TX (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 15/085,243

(22) Filed: Mar. 30, 2016

(51) Int. Cl.
G06F 9/30 (2018.01)
G06F 12/0875 (2016.01)

(52) U.S. Cl.
CPC ...... G06F 9/30032 (2013.01); G06F 12/0875 (2013.01); G06F 2212/452 (2013.01)

(58) Field of Classification Search
None
See application file for complete search history.

(56) References Cited

U.S. PATENT DOCUMENTS

| 5,872,946 | A | 2/1999 | Narayan |
| 6,629,233 | B1 | 9/2003 | Kahle |
| 9,164,772 | B2 | 10/2015 | Dockser |
| 2005/0050303 | A1 | 3/2005 | Rosner |
| 2008/0201558 | A1* | 8/2008 | Hosoda ............... G06F 12/0857 712/220 |
| 2009/0019261 | A1* | 1/2009 | Nguyen ............... G06F 9/30061 712/207 |
| 2009/0119485 | A1* | 5/2009 | Smith ................ G06F 9/30152 712/205 |
| 2010/0122066 | A1* | 5/2010 | Fischer ................ G06F 9/325 712/205 |
| 2012/0204004 | A1* | 8/2012 | Dockser ............... G06F 9/3814 712/205 |

* cited by examiner

Primary Examiner — George Giroux
(74) Attorney, Agent, or Firm — Meyertons, Hood, Kivlin, Kowert & Goetzel, P.C.

(57) ABSTRACT

In an embodiment, an apparatus includes a first buffer, a second buffer, and a control circuit. The control circuit may be configured to receive a first plurality of instructions included in a program. The control circuit may also be configured to store each of the first plurality of instructions in an entry of a first number of entries in the first buffer, arranged in the first number of entries dependent upon a received order. The control circuit may be further configured to select a second plurality of instructions from the first buffer. The second plurality of instructions may be selected dependent upon a program order. The control circuit may be configured to store each of the second plurality of instructions in an entry of a second number of entries in the second buffer, arranged in the second number of entries dependent upon the program order.

20 Claims, 5 Drawing Sheets

ORDERING INSTRUCTIONS IN A PROCESSING CORE INSTRUCTION BUFFER

BACKGROUND

Technical Field

Embodiments described herein are related to the field of integrated circuit implementation, and more particularly to the operation of processing cores.

Description of the Related Art

Computing systems include one or more processors and one or more memories. Multiple instructions comprising a program are stored in a memory and to run the program, instructions are fetched in a given order to be processed in a processor. In a processing core, instructions are fetched for execution from an instruction cache or other system memory prior to execution by the processor core. Before being executed by the processor core, the instructions may be sent through various stages of an instruction pipeline. Throughout the stages of the instruction pipeline, the fetched instructions may be placed into one or more buffers including a first placement into a fetch buffer and afterwards, placement into a decode buffer.

SUMMARY OF THE EMBODIMENTS

Various embodiments of a processor are disclosed. Broadly speaking, a system, an apparatus, and a method are contemplated in which the apparatus includes a first instruction buffer including a first number of ordered entries, a second instruction buffer including a second number of ordered entries, and a control circuit. The control circuit may be configured to receive a first plurality of instructions. Each instruction of the first plurality of instructions may be included in a program. The control circuit may also be configured to store each instruction of the first plurality of instructions in a respective entry of the first number of ordered entries. The first plurality of instructions may be arranged in the first number of ordered entries dependent upon a received order. The control circuit may be further configured to select a second plurality of instructions from the first instruction buffer. The second plurality of instructions may be selected dependent upon a program order. The control circuit may also be configured to store each instruction of the second plurality of instructions in a respective entry of the second number of ordered entries. The second plurality of instructions may be arranged in the second number of ordered entries dependent upon the program order.

In a further embodiment, the control circuit may be further configured to identify an entry of the first number of ordered entries that includes an oldest instruction of the first plurality of instructions. In one embodiment, the first number may be greater than the second number.

In another embodiment, further including a third instruction buffer, the control circuitry may be further configured to select a third plurality of instructions from the third instruction buffer, and to store each instruction of the third plurality of instructions in a respective entry of the second number of ordered entries. The third plurality of instructions may be arranged in the second number of ordered entries dependent upon the program order of the second and third pluralities of instructions.

In a further embodiment, the control circuit may be further configured to select a fourth plurality of instructions from the first plurality of instructions stored in the first number of ordered entries. The fourth plurality of instructions may include each instruction of the first plurality of instructions excluded from the second plurality of instructions. The control circuit may also be configured to store the fourth plurality of instructions in the third instruction buffer.

In an embodiment, the first plurality of instructions may be received from a plurality of memories. In a further embodiment, the received order may be dependent upon a respective memory of the plurality of memories from which each instruction of the first plurality of instructions is received.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

This disclosure describes an apparatus and a method for fetching instructions from one or more memories and arranging them in a predetermined order in a decode buffer in a processing core. Instructions may be retrieved from an instruction cache, a fill buffer, a memory management unit, or other system memory. The instructions may be processed in an instruction pipeline, being placed into one or more buffers, such as a fetch buffer, during the process. These instructions may be required to be placed in program order into a decode buffer near the end of the pipeline to await decode and then execution.

Some processing systems may place the instructions in program order into the fetch buffer near the beginning of the pipeline, such that the first ordered instruction is placed in a first ordered entry in the buffer, the second ordered instruction into a second ordered entry, and so forth. Such an ordered placement in the fetch buffer may utilize a large number of multiplexing circuits in order to fetch and store instructions from a plurality of memory sources into the fetch buffer in the correct order.

As used herein, "program order" refers to an instruction sequence corresponding to the order in which the instructions are executed as a program runs. In some embodiments, program order may not always correspond to an order in which instructions are stored in a memory, as branch and jump instructions can cause a program's flow to jump to instructions in different parts of the memory. In terms of program order, an "oldest" instruction of a set of instructions refers to the instruction to be executed first out of the set. A "youngest" or "newest" instruction of the set refers to the instruction to be executed last out of the set. Program order goes from the oldest instruction to the newest.

Embodiments of systems, devices, and methods for retrieving and suitably ordering instructions into a decode buffer are disclosed herein. The disclosed embodiments demonstrate methods for fetching and organizing the instructions that may reduce an amount of circuitry and power used in an instruction pipeline.

Figure 1:
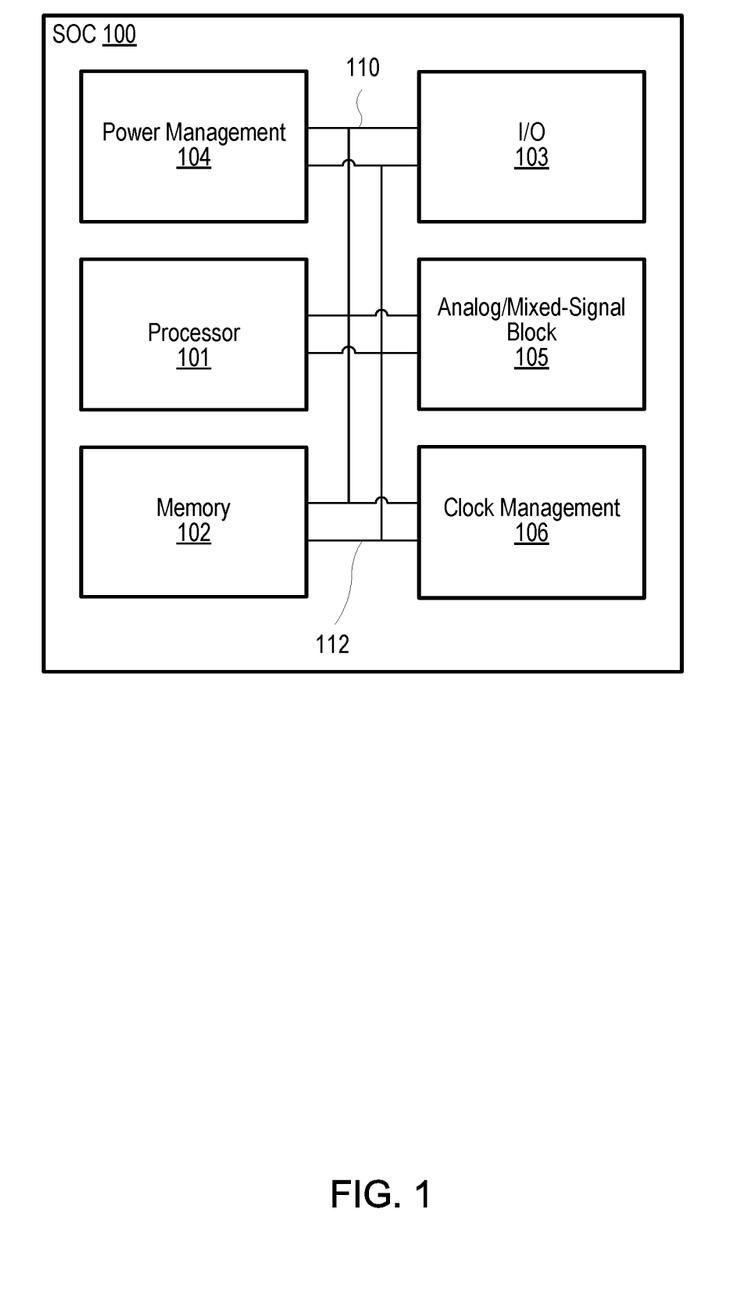
FIG. 1 depicts a block diagram of an embodiment of a system-on-a-chip (SoC).

A block diagram of an embodiment of an SoC is illustrated in FIG. 1. In the illustrated embodiment, SoC 100 includes processor 101 coupled to Memory Block 102, I/O block 103, Power Management Unit 104, Analog/Mixed-Signal Block 105, Clock Management Unit 106, all coupled through Bus 110. Additionally, Clock Management Unit 106 may provide a clock signal 112 to the functional blocks in SoC 100. In various embodiments, SoC 100 may be configured for use in a mobile computing application such as, e.g., a tablet computer, smartphone or wearable device.

Processor 101 may, in various embodiments, be representative of a general-purpose processor that performs computational operations. For example, Processor 101 may be a central processing unit (CPU) such as a microprocessor, a microcontroller, an application-specific integrated circuit (ASIC), or a field-programmable gate array (FPGA). In some embodiments, Processor 101 may include multiple CPU cores and may include one or more register files and memories.

In various embodiments, Processor 101 may implement any suitable instruction set architecture (ISA), such as, e.g., PowerPC™, ARM®, or x86 ISAs, or combination thereof. Processor 101 may include one or more bus transceiver units that allow Processor 101 to communication to other functional blocks via Bus 110, such as, Memory Block 102, for example. Instructions to be executed by Processor 101 may be fetched from Memory Block 102 or from an interface in I/O 103. In some embodiments, Processor 101 may include an instruction cache for storing a copy of frequently used instructions.

Memory Block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), Resistive Random Access Memory (RRAM or ReRAM), or a Magnetoresistive Random Access Memory (MRAM). Some embodiments may include a single memory, such as Memory Block 102 and other embodiments may include more than two memory blocks (not shown). In some embodiments, Memory Block 102 may be configured to store program instructions that may be executed by Processor 101. Memory Block 102 may, in other embodiments, be configured to store data to be processed, such as graphics data, for example. Memory Block 102, may, in some embodiments, include a memory controller for interfacing to memory external to SoC 100, such as, for example, one or more DRAM chips.

I/O Block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. I/O Block 103 may include general-purpose input/output pins (I/O pins). In some embodiments, I/O Block 103 may be configured to implement a version of Universal Serial Bus (USB) protocol, IEEE 1394 (Firewire®) protocol, or, and may allow for program code and/or program instructions to be transferred from a peripheral storage device for execution by Processor 101. In one embodiment, I/O Block 103 may be configured to perform the data processing necessary to implement an Ethernet (IEEE 802.3) networking standard.

Power Management Unit 104 may be configured to manage power delivery to some or all of the functional blocks included in SoC 100. Power Management Unit 104 may comprise sub-blocks for managing multiple power supplies for various functional blocks. In various embodiments, the power supplies may be located in Analog/Mixed-Signal Block 105, in Power Management Unit 104, in other blocks within SoC 100, or come from a source external to SoC 100 and coupled through power supply pins. Power Management Unit 104 may include one or more voltage regulators to adjust outputs of the power supplies to various voltage levels as required by functional blocks in SoC 100, such as for reduced power modes, for example.

Analog/Mixed-Signal Block 105 may include a variety of circuits including, for example, a crystal oscillator, an internal oscillator, a phase-locked loop (PLL), delay-locked loop (DLL), or frequency-locked loop (FLL). One or more analog-to-digital converters (ADCs) or digital-to-analog converters (DACs) may also be included in Analog/Mixed Signal Block 105. In some embodiments, Analog/Mixed-Signal Block 105 may also include radio frequency (RF) circuits that may be configured for operation with cellular telephone networks. Analog/Mixed-Signal Block 105 may include one or more voltage regulators to supply one or more voltages to various functional blocks and circuits within those blocks.

Clock Management Unit 106 may be configured to enable, configure and monitor outputs of one or more clock sources. In various embodiments, the clock sources may be located in Analog/Mixed-Signal Block 105, within Clock Management Unit 106, in other blocks within SoC 100, or come from external to SoC 100, coupled via one or more I/O pins. In some embodiments, Clock Management 106 may be capable of configuring a selected clock source before it is distributed throughout SoC 100. Clock Management Unit 106 may include registers for selecting an output frequency or reference clock of a PLL, FLL, DLL, or other type of closed-loop clock source. One or more clock signal outputs 112 may provide clock signals to various functional blocks of SoC 100.

System Bus 110 may be configured as one or more buses to couple Processor 101 to the other functional blocks within the SoC 100 such as, e.g., Memory Block 102 and I/O Block 103. In some embodiments, System Bus 110 may include interfaces coupled to one or more of the functional blocks that allow a particular functional block to communicate through the bus. In some embodiments, System Bus 110 may allow movement of data and transactions (i.e., requests and responses) between functional blocks without intervention from Processor 101. For example, data received through the I/O Block 103 may be stored directly to Memory Block 102.

SoC 100 may be implemented in any suitable IC manufacturing process, such as, for example, a Complementary Metal-oxide Semiconductor (CMOS) processes. A Metal-Oxide Semiconductor Field-Effect Transistor (MOSFET) describes a type of transistor that may be used in modern digital logic designs. MOSFETs are designed as one of two basic types, n-channel and p-channel. CMOS describes a circuit designed with a mix of n-channel and p-channel MOSFETs. In CMOS designs, n-channel and p-channel MOSFETs may be arranged such that a high level on the gate of a MOSFET turns an n-channel (NMOS) transistor on, i.e., opens a conductive path, and turns a p-channel (PMOS) transistor off, i.e., closes a conductive path. Conversely, a low level on the gate of a MOSFET turns a p-channel on and an n-channel off. While CMOS logic is used in the examples described herein, it is noted that any suitable semiconductor manufacturing process may be used to fabricate the circuits described in embodiments described herein.

It is noted that the SoC illustrated in FIG. 1 is merely an example. In other embodiments, different functional blocks and different configurations of functions blocks may be possible dependent upon the specific application for which the SoC is intended.

Figure 2:
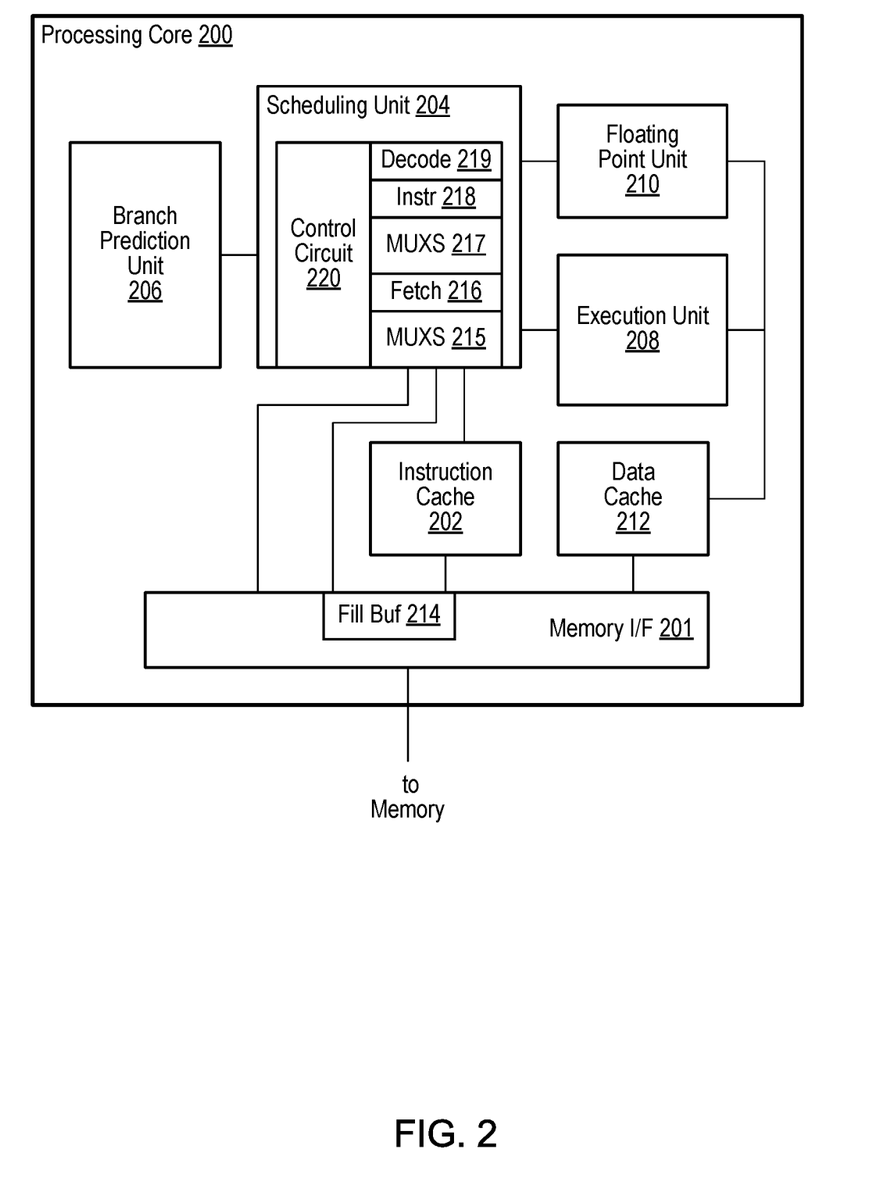
FIG. 2 illustrates a block diagram of an embodiment of a processing core.

Moving now to FIG. 2, a block diagram of an embodiment of processing core is illustrated. Processing Core 200 may be a part of a larger processor or SoC, corresponding to Processor 101, for example, in SoC 100 as illustrated in FIG. 1, and may be one of multiple processing cores in the processor or SoC. In the present embodiment, Processing Core 200 includes memory interface (memory I/F) 201 coupled to Instruction Cache 202, Scheduling Unit 204, and Data Cache 212. Scheduling Unit 204 is coupled to Branch Prediction Unit 206, Execution Unit 208, and Floating Point Unit 210. Memory Interface 201 further includes Fill Buffer (Fill Buf) 214. Scheduling Unit 204 further includes Multiplexing Circuits (MUXS) 215 and 217, Fetch Buffer (Fetch) 216, Instruction Buffer (Instr) 218, Decode Buffer (Decode) 219, and Control Circuit 220.

In the illustrated embodiment, Memory Interface 201 is used to fetch instructions and data from memories located outside of processing core 200. Memory Interface 201 may be coupled to a higher level cache, such as, for example, an L2 or L3 cache, to a system memory, e.g., a static random access memory (SRAM) or a dynamic random access memory (DRAM), and to a non-volatile storage such as flash memory or a hard disk drive (HDD). In various embodiments, Memory Interface 201 may be coupled directly to some or all of these memories via a bus, or coupled to one or more memory controller units that receive memory requests from Memory Interface 201 and reply to the requests with appropriate data from a corresponding memory location. The various memory sources may return various amounts of data in response to a memory request. Memory Interface 201 may include individual circuits for fetching instructions and fetching data, or may share circuitry for data and instruction fetches.

Instructions fetched via Memory Interface 201 may be stored in Instruction Cache 202. Instruction Cache 202 may be implemented as any suitable type of cache memory, such as, for example, direct mapped cache, two-way set associative, four-way set associative, and the like. In the present embodiment, Instruction Cache 202 includes multiple entries, referred to herein as cache lines. Each cache line may store one or more instructions from a software or firmware program to be executed by processing core 200. In some embodiments, instructions may be fetched one or more cache lines at a time to improve an efficiency of memory accesses. A given instruction, or set of instructions, may be prefetched, i.e., copied from memory into a corresponding cache line before the processing core is ready to execute the instruction. Such prefetching may reduce a number of wait states processing core 200 experiences by having a series of instructions preloaded into Instruction Cache 202 where they may be accessed faster than other memory locations in a computing system including processing core 200.

In the illustrated embodiment, Scheduling Unit 204 fetches instructions and arranges the fetched instructions for execution by Execution Unit 208 or Floating Point Unit 210. Moreover, Scheduling Unit 204 retrieves instructions from Instruction Cache 202, and places the instruction in a processing order into Decode Buffer 219 utilizing Multiplexing Circuits 215 and 217, Fetch buffer 216, and Instruction Buffer 218. Control Circuit 220 is used to control Multiplexing Circuits 215 to route fetched instructions from Instruction Cache 202 into Fetch Buffer 216, and Multiplexing Circuits 217 o route instructions from Fetch Buffer 216 into Instruction Buffer 218 and Decode Buffer 219.

Scheduling Unit 204 may also control prefetching of instructions for Instruction Cache 202. In the event of a cache miss, Scheduling Unit 204 may issue a request for the missed instruction via Memory I/F 201. A cache miss occurs when an instruction is requested from a corresponding memory address, and the instruction associated with that memory address is not currently stored in Instruction Cache 202. The address corresponding to the missed instruction may correspond to a location in Memory Block 102, or may correspond to a memory location in a memory device external to SoC 100.

Scheduling Unit 204, in the present embodiment, uses Branch Prediction Unit 206 to help predict a flow of an active program. When an instruction other than a branch or jump instruction is executed, a program counter within Scheduling Unit 204 is incremented (or, in some embodiments, decremented). A value in the program counter is used to point to a memory address storing the next instruction for the active program. When a branch or jump instruction is executed, a new value may be written to the program counter, causing program flow to deviate to another portion of code, such as, for example, a subroutine or back to a beginning of a software loop. During execution of a branch instruction, a determination is made based on a data value or condition of processing core 200 to either continue the linear program flow (i.e., do not take a branch), or to fetch a next instruction from an non-contiguous memory location (i.e., take the branch). When prefetching instructions, a branch instruction impacts the next prefetch. For example, if a branch instruction is included in a first prefetch and a second prefetch assumes a linear program flow, then if the branch is taken (i.e., non-linear program flow), the second prefetch may be useless as the second prefetched instructions won't be the next instructions to be executed. Branch Prediction Unit 206 is used by Scheduling Unit 204 to help predict if a given branch instruction will be taken or not.

In the present embodiment, when a cache miss occurs, due to, for example, a branch misprediction, Scheduling Unit 204 issues a memory request to Memory I/F 201, which in turn retrieves a set of instructions beginning the corresponding memory address in Memory Block 102 or an external memory source via I/O Block 103. When the set of instructions is returned, the instructions may be placed in Fill Buffer 214 before being stored in Instruction Cache 202. Depending on a state of Scheduling Unit 204, the instructions may be sent to Scheduling Unit 204 in parallel with or before the instruction is sent to Instruction Cache 202, particularly if Scheduling Unit 204 is waiting for the instructions. This parallel instruction path may allow instructions to be retrieved and routed into Decode Buffer 219 more efficiently. In addition to the Fill Buffer, Memory I/F 201 may include a direct path to Scheduling Unit 204 for instructions arriving late from the corresponding memory source. This direct path may be referred to as a fill forward path. In some embodiments, the fill forward path may be split into two or more paths, such as an early forward fill and a late forward fill to handle various latencies from the memory sources.

In the present embodiment, Execution Unit 208 retrieves instructions from an instruction queue that has been populated from Decode Buffer 219. Execution Unit 208 processes logic and integer instructions, while floating point instructions are retrieved by Floating Point Unit 210. In some embodiments, Execution Unit 208 and Floating Point Unit 210 may retrieve instructions from the same instruction queue, in which instructions in the queue are tagged for processing by the appropriate unit. In other embodiments, Scheduling Unit 204 may include separate instruction queues for Execution Unit 208 and Floating Point Unit 210. To process instructions, Execution Unit 208 or Floating Point Unit 210 may fetch data from Data Cache 212.

Data Cache 212 may be implemented as any suitable type of cache memory, such as, for example, direct mapped cache, two-way set associative, four-way set associative, and the like. In the present embodiment, Data Cache 212 includes multiple entries, referred to herein as data cache lines. Each data cache line may store one or more data items to be used by Execution Unit 208 and/or Floating Point Unit 210. Data items may include any data values used during process of instructions.

It is noted that, to improve clarity and to aid in demonstrating the disclosed concepts, the diagram of processing core 200 illustrated in FIG. 2 has been simplified. In other embodiments, different and/or additional circuit blocks and different configurations of the circuit blocks are possible and contemplated.

Figure 3:
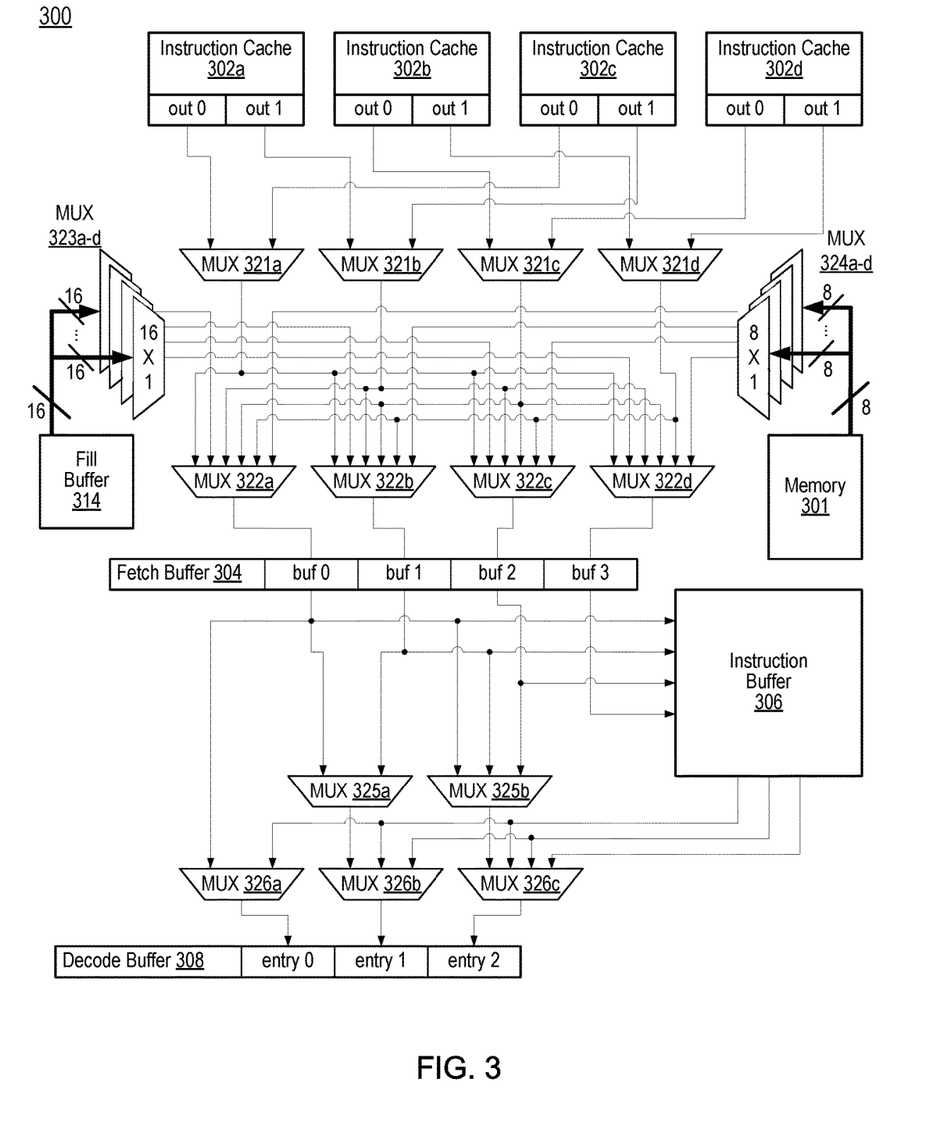
FIG. 3 shows a block diagram of an instruction pipeline in a processing core.

Turning to FIG. 3, a block diagram of an instruction pipeline in a processing core is illustrated. Instruction Pipeline 300 may be included in a computing system as part of a processor, such as Processor 101 of SoC 100 in FIG. 1. In the illustrated embodiment, Instruction Pipeline 300 includes Instruction Caches 302*a-d* coupled to Fetch Buffer 304 via multiplexor circuits (MUX) 321*a-d* and 322*a-d*. Fetch Buffer 304 is further coupled to Instruction Buffer 306 as well as to Decode Buffer 308 via MUXs 325*a-b* and 326*a-c*. Additionally, Memory 301 is coupled to Fetch Buffer 304 via MUXs 324*a-d* and MUXs 322*a-d*. Fill Buffer 314 is also coupled Fetch Buffer 304 via MUXs 323*a-d* and MUXs 322*a-d*. Signal lines between the blocks of FIG. 3 are intended to indicate a path for an entire instruction of any suitable number of bits, and not just a single bit. Buses, indicated by the slashes with a corresponding number, indicate a number of parallel instructions, not a number of parallel bit lines.

In the illustrated embodiment, Instruction Pipeline 300 includes circuits involved with retrieving and arranging an order for instructions to be executed by an execution unit or coprocessor, such as, for example, Execution Unit 208 or Floating Point Unit 210, both illustrated in FIG. 2. Control circuitry, such as, e.g., Control Circuit 220 in FIG. 2, manipulates the various multiplexing circuits to retrieve instructions via one of three memory paths. Control Circuit 220 then arranges, using the multiplexing circuits, the retrieved instructions in Decode Buffer 308 in a same order as they occur in a respective software program flow. This order is referred to herein as "program order." Instructions, including data values associated with some instructions, may be retrieved from various memories in a computing system, and therefore various instructions may take different amounts of time to be read and received into Instruction Pipeline 300. Due to these potential variances in retrieval time, instructions may not be received into Instruction Pipeline 300 in the program order and, therefore, Instruction Pipeline 300 may rearrange the instructions to place them into program order.

Instruction Cache 302*a-d*, in the present embodiment, includes four memory arrays, enumerated 'a' through 'd.' Instruction Cache 302*a-d* may correspond to Instruction Cache 202 in FIG. 2. Each array of Instruction Cache 302*a-d* is capable of producing two instructions concurrently, allowing Instruction Cache 302 to make eight instructions available for selection at a given time. It is noted that each instruction may include any suitable number of data bits to conform to a given instruction set architecture (ISA) used by Execution Unit 208 or Floating Point Unit 210. As described above in regards to Instruction Cache 202, instructions retrieved from any memory source in a computing system may be stored in Instruction Cache 302*a-d*, and in some embodiments, these instructions may be prefetched before a preceding instruction has been executed.

In the example embodiment, Fill Buffer 314 corresponds to Fill Buffer 214 in FIG. 2. As described above in regards to Fill Buffer 214, Fill Buffer 314 is used to store instructions fetched from a system memory before the instructions may be stored in Instruction Cache 302*a-d*. Under some conditions, Instruction Pipeline 300 may be ready to receive instructions stored in Fill Buffer 314 before they have been stored in Instruction Cache 302*a-d*. Under such conditions, Instruction Pipeline 300 includes a path from Fill Buffer 314 to retrieve instructions without waiting for the instructions to be stored in Instruction Cache 302a-d. These instructions may be stored in Instruction Cache 302a-d concurrent to or after being copied into Instruction Pipeline 300. Similar to Instruction Cache 302a-d, Fill Buffer 314 may be capable of producing more than one instruction for output concurrently. In the illustrated embodiment, Fill Buffer 314 is capable of outputting 16 instructions concurrently.

Memory 301, in the present embodiment, represents a direct memory path into one or more memory arrays for retrieving instructions. Memory 301 may correspond to Memory I/F 201 in FIG. 2, or in other embodiments, may correspond to any suitable type of memory such as Memory 102 in FIG. 1. Instructions may be retrieved via the Memory 301 path rather than via Instruction Cache 302a-d or Fill Buffer 314 when those memories do not include copies of an instruction or instructions that are ready to be processed by Instruction Pipeline 300, for example, if a cache miss occurs. The path to Memory 301 may represent a fastest path for retrieving instructions from a system memory into Instruction Pipeline 300. As described above for Instruction Cache 302a-d and Fill Buffer 314, Memory 301 may also be capable of presenting more than one instruction simultaneously for output. In the current embodiment, Memory 301 outputs eight instructions at a time to be read into Instruction Pipeline 300.

Fetch Buffer 304 holds instructions that have been fetched for execution. In some embodiments, Fetch Buffer 304 may correspond to Fetch Buffer 216 in FIG. 2. In the example embodiment, Fetch Buffer 304 includes four entries, each entry able to store one instruction. Instructions are stored in Fetch Buffer 304 in program order, with buffer (buf) 0 holding the oldest instruction of the four, followed by buffer 1 holding the next oldest instruction, buffer 2 holding the oldest instruction after buffer 1, and buffer 3 holding the newest instruction of the four. As disclosed above, instructions may not be received by any of the three memory paths in program order. Multiplexing circuits are, therefore, used to route fetched instructions into the appropriate buffer entry of Fetch Buffer 304.

MUXs 321a-d are used to select four of the eight instructions output by Instruction Cache 302a-d, with each MUX 321 receiving two of the eight instructions. MUXs 323a-d are used to sort the 16 instructions output by Fill Buffer 314, thereby allowing any of the sixteen instructions to be routed to any of MUXs 322a-d. Similarly, MUXs 324a-d are used to sort the eight instructions from Memory 301 and route four of the instructions to any of the four MUXs 322a-d. MUXs 322a-d each receive six instructions, one each from MUXs 321a-d, one from a respective MUX 323a-d, and one from a respective MUX 324a-d. MUXs 322a-d, therefore, may each be capable of receiving the oldest instruction in terms of program order, regardless of where the oldest instruction was stored in any of Instruction Cache 302a-d, Memory 301, or Fill Buffer 314. MUX 322a is used to select an oldest instruction for buffer 0 of Fetch Buffer 304, and MUXs 322b-d are similarly used to select the appropriate instruction for each of buffers 1-3, respectively. Collectively, MUXs 321a-d, 322a-d, 323a-d, and 324a-d may, in some embodiments, correspond to Multiplexing Circuits 215 of FIG. 2.

Decode Buffer 308 holds instructions until they are decoded and processed by an execution unit. In some embodiments, Decode Buffer 308 may correspond to Decode Buffer 219 in FIG. 2. In the illustrated embodiment, Decode Buffer 308 includes three entries, entry 0, entry 1, and entry 2, each capable of holding one instruction. The oldest of the three instructions is held in entry 0 and the newest in entry 2. The ordered instructions stored in Fetch Buffer 304 may be transferred into Decode Buffer 308 via MUXs 325a-b and MUXs 326a-c. MUXs 325a-b and 326a-c may, in some embodiments, correspond to Multiplexing Circuits 217 in FIG. 2. Since Decode Buffer 308 has fewer entries than Fetch Buffer 304, the newest instruction (the instruction held in buffer 3) is only routed into Instruction Buffer 306, and not directly into Decode Buffer 308. In some embodiments, Instruction Buffer 306 may correspond to Instruction Buffer 218 in FIG. 2. If Instruction Buffer 306 has previously received instructions from Fetch Buffer 304, then Instruction Buffer 306 may hold the oldest instruction rather than Fetch Buffer 304. In some embodiments, Instruction Buffer 306 may output the three oldest instructions held within Instruction Buffer 306, while in other embodiments, Instruction Buffer 306 may receive a command from Control Logic 220 to output the three oldest instructions. Control Circuit 220 may pick the three oldest instructions from a combination of Fetch Buffer 304 and Instruction Buffer 306. Instructions to be placed into Decode Buffer 308 are selected in program order from the combination of Fetch Buffer 304 and Instruction Buffer 306, via MUXs 326a.

A multiplexing circuit (also referred to as a "multiplexor" or "mux"), as referred to herein, is a circuit used to select one or more output signals from two or more input signals. The output signal is chosen by one or more control signals that are not illustrated in order to reduce complexity of the drawing. The multiplexing circuits in the illustrated embodiment include a variety of input and output configurations. For example, MUXs 321a-d, MUX 325a, and MUX 326a are each 2×1 multiplexing circuits, indicating that each circuit is designed to receive two input signals and select one as an output signal. MUXs 323a-d are each 16×1 multiplexing circuits, indicating that 16 inputs are received and any one of the 16 input signals may be selected as the output signal. Generally speaking, the greater the number inputs, the more complex the multiplexing circuit is and differences in a number of transistors in the circuits may grow by more than linear increments. For example, a 4×1 multiplexing circuit may include more than twice the number of transistors of a 2×1 circuit.

It is noted that Instruction Pipeline 300 illustrated in FIG. 3 is an example for demonstrating the disclosed concepts. The number of functional blocks shown are limited for clarity. In other embodiments, for example, any suitable number of memory arrays may be used for an instruction cache. Any suitable number of multiplexing circuits may also be included. Fetch buffers and decode buffers may include any suitable number of instruction entries.

Figure 4:
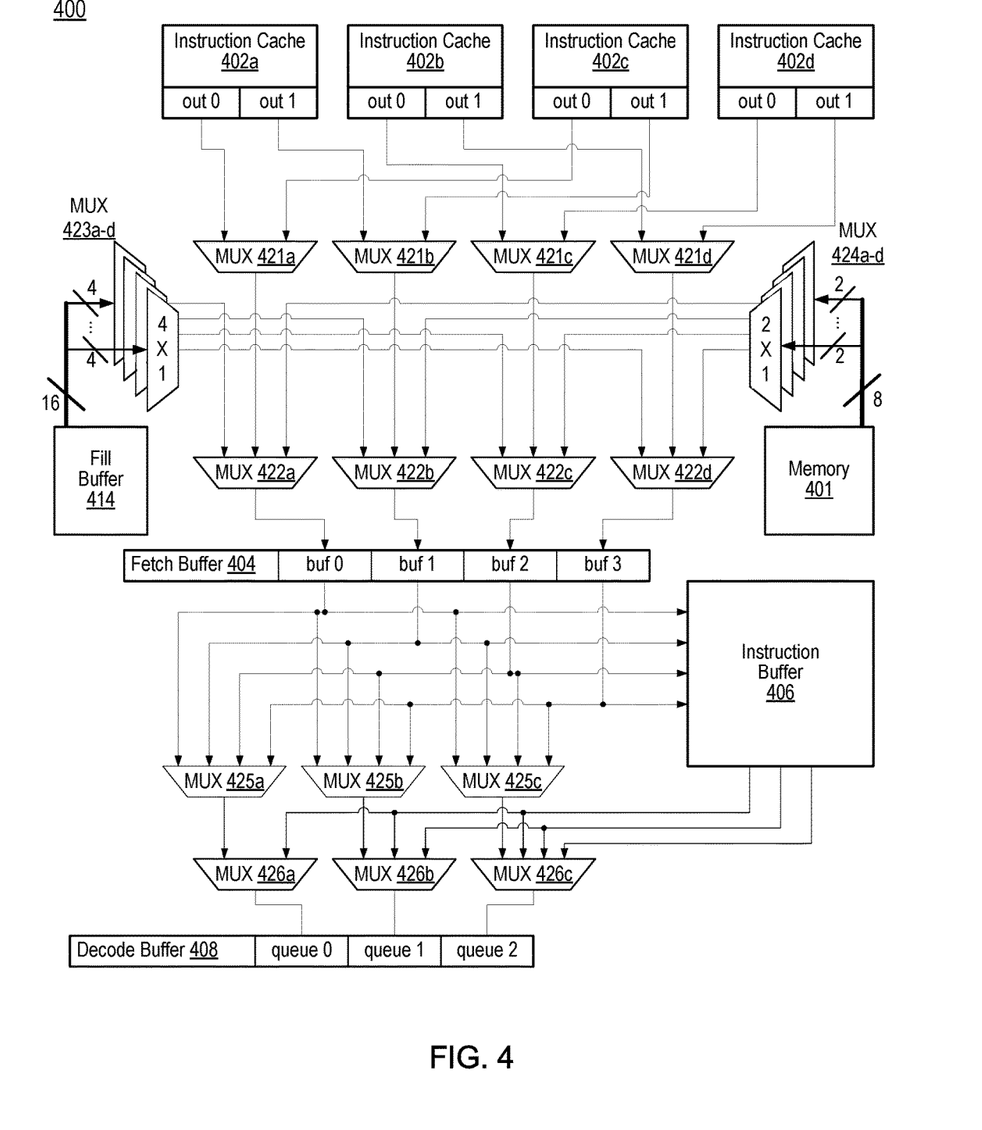
FIG. 4 shows another block diagram of an instruction pipeline in a processing core.

Turning now to FIG. 4, another block diagram of an instruction pipeline in a processing core is shown. Instruction Pipeline 400 includes Instruction Caches 402a-d coupled to Fetch Buffer 404 via multiplexor circuits (MUX) 421a-d and 422a-d. Fetch Buffer 404 is further coupled to Instruction Buffer 406 as well as to Decode Buffer 408 via MUXs 425a-c and 426a-c. Additionally, Memory 401 is coupled to Fetch Buffer 404 via MUXs 424a-d and MUXs 422a-d. Fill Buffer 414 is also coupled Fetch Buffer 404 via MUXs 423a-d and MUXs 422a-d. As described in FIG. 3, signal lines between the blocks of FIG. 4 are intended to indicate a path for an entire instruction of any suitable number of bits, and not a single bit. Buses, indicated by the slashes with a corresponding number, indicate a number of parallel instructions, not a number of parallel bit lines.

Many of the components in the illustrated embodiment correspond to the similarly numbered components in FIG. 3, except where noted otherwise. For example, Instruction Cache 402a-d, Memory 401, and Fill Buffer 414 correspond to the descriptions of Instruction Cache 302a-d, Memory 301, and Fill Buffer 314. Instruction Pipeline 400 includes three memory paths (from Instruction Cache 402a-d, from Memory 401, and from Fill Buffer 414) similar to Instruction Pipeline 300.

In the present embodiment, Fetch Buffer 404, similar to Fetch Buffer 304, holds instructions that have been fetched for execution, and may correspond to Fetch Buffer 216 in FIG. 2. Also like Fetch Buffer 304, Fetch Buffer 304 includes four entries, buffer 0 (buf 0) through buffer 3 (buf 3), each entry able to store one instruction. In contrast to Fetch Buffer 304, instructions are not necessarily stored in Fetch Buffer 404 in program order. In some embodiments, instructions may be stored in Fetch Buffer 404 in any order, while in other embodiments, some ordering restrictions may be applied. In the illustrated embodiment, instructions may be placed in Fetch Buffer 404 in program order, however, without limiting the oldest instruction to buffer 0 of Fetch Buffer 404. The oldest instruction may be placed into any of buffer entries 0-3 with the remaining three instructions placed in program order into the next highest numbered buffer entry until buffer 3 is filled, at which point the order returns to buffer 0 and continues in program order until all four instructions are placed into Fetch Buffer 404. For example, the oldest instruction may be placed into buffer 2, the second oldest instruction into buffer 3, and then wrapping around to place the third oldest into buffer 0 and place the youngest of the four instructions into buffer 1.

As previously disclosed, control circuitry, such as, for example, Control Circuit 220 in FIG. 2, uses multiplexing circuits to route fetched instructions via any of the three memory paths into an appropriate buffer entry of Fetch Buffer 404. MUXs 421a-d, 422a-d, 423a-d, and 424a-d may, in some embodiments, correspond to Multiplexing Circuits 215 in FIG. 2. Instructions from Instruction Cache 402a-d are routed and ordered using MUXs 421a-d and MUXs 422a-d. Since strict program order starting in buffer 0 is not required, the amount of multiplexing may be reduced in comparison to Instruction Pipeline 300. For example, MUXs 422a-d are illustrated as 3×1 multiplexing circuits, compared to MUXs 322a-d in Instruction Pipeline 300, which are 6×1 multiplexing circuits. As discussed above, doubling a number of inputs to a multiplexing circuit may more than double the number of transistors in the circuits. MUXs 422a-d, therefore, may use fewer than half of the number of transistors as MUXs 322a-d. The reduction of multiplexing circuitry, however, may cause the order of the instructions stored in Fetch Buffer 404 to be dependent upon the received order of the instructions. As used herein, the "received order" refers to the path through the multiplexing circuits from which each instruction is routed to Fetch Buffer 404. For example, an instruction from output 0 of Instruction Cache 402b only goes through MUX 421c, from which it can only go through MUX 422c and into buffer 2 of Fetch Buffer 404. If the oldest instruction, therefore, comes from output 0 of Instruction Cache 402c, then buffer 2 of Fetch Buffer 404 will hold the oldest instruction.

For the fill forward path from Memory 401, MUXs 424a-d are each 2×1 multiplexing circuits compared to MUXs 324a-d which are each 8×1 multiplexing circuits. Again, eliminating the requirement to place the oldest instruction into buffer 0 reduces the amount of multiplexing required to place instructions into the proper order in Fetch Buffer 404. This 4-to-1 reduction in the number of inputs on each multiplexing circuit may result in a greater than 4-to-1 reduction in the number of transistors in MUXs 424a-d compared to MUXs 324a-d. Similarly, for the Fill Buffer 414 path, MUXs 423a-d are each 4×1 multiplexing circuits as compared to the 16×1 multiplexing circuits used for MUXs 323a-d in the same path in Instruction Pipeline 300. Again, the 4-to-1 reduction in inputs may result in a greater than 4-to-1 savings in transistors in each MUX 423a-d. Additionally, the reduction in multiplexing circuitry of MUXs 423a-d and 4424a-d may cause the order of the instructions stored in Fetch Buffer 404 to be dependent upon the received order of the instructions, which, as previously disclosed, is dependent upon from which memory locations the instructions are received.

In the illustrated embodiment, once four instructions have been stored in Fetch Buffer 404, Decode Buffer 408 retrieves three instructions into entries 0-2 from a combination of Fetch Buffer 404 and Instruction Buffer 406 by fetching the three oldest instructions stored in the combination. The three fetched instructions are routed into the appropriate entries 0-2 in Decode Buffer 408 via MUXs 425a-c and 426a-c. In some embodiments, Decode Buffer 408 may correspond to Decode Buffer 219, Instruction Buffer 406 may correspond to Instruction Buffer 218, and MUXs 425a-c and 426a-c may correspond to Multiplexing Circuits 217, all shown in FIG. 2.

It is noted that, since anyone of buffers 0-3 in Fetch Buffer 404 may hold the oldest instruction, more multiplexing circuitry is used in MUXs 425a-c than the comparable MUXs 325a-b in Instruction Pipeline 300. MUXs 425a-c include three 4×1 multiplexing circuits, while MUXs 325a-b includes one 2×1 and one 3×1 multiplexing circuits. MUXs 325a-b, therefore, may include fewer transistors than MUXs 425a-c. In some embodiments, however, the savings in the number of transistors used for MUXs 422a-d, MUXs 423a-d, and MUXs 424a-d may outweigh the additional number of transistors used in MUXs 425a-c, thereby potentially generating a net savings in size and power consumption of the circuits.

It is further noted that the method illustrated in FIG. 4 is merely an example for demonstration. In other embodiments, any suitable number of memory paths may be included. For example, the fill forward path may include both an early fill forward path and a late fill forward path, potentially uses additional multiplexing circuits.

Figure 5:
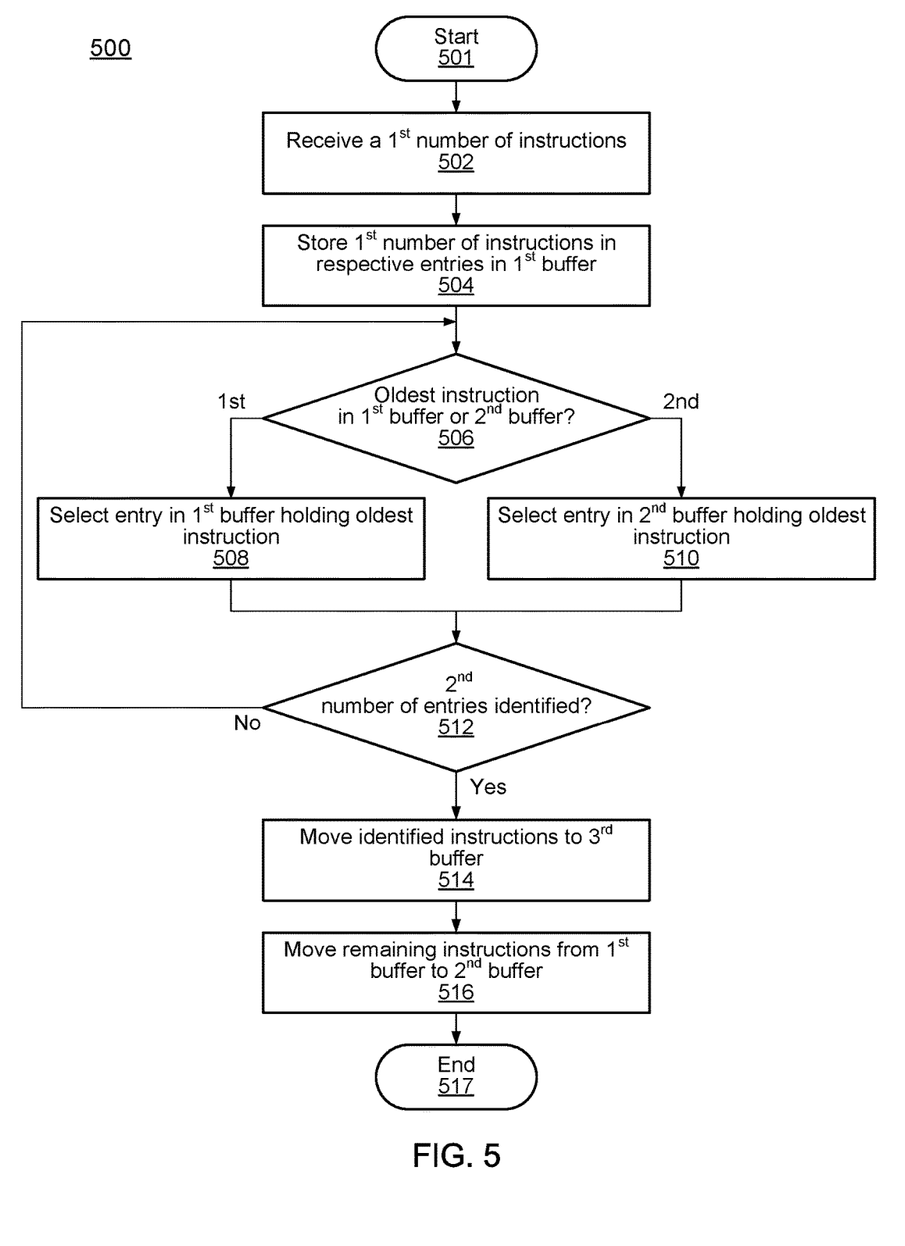
FIG. 5 illustrates a flow diagram of an embodiment of a method for selecting and buffering instructions in a processing core.

Moving now to FIG. 5, a flow diagram illustrating an embodiment of a method for selecting and buffering instructions in a processing core is shown. In some embodiments, method 500 may be applied to an instruction pipeline, such as, for example, Instruction Pipeline 400 of FIG. 4. Referring collectively to FIG. 4 and the flow diagram of FIG. 5, the method may begin in block 501.

A first number of instructions are retrieved (block 502). In present embodiment, control circuitry, such as, e.g., Control Circuit 220 in FIG. 2, utilizes a combination of MUXs 421a-d, 422a-d, 423a-d, and 424a-d to retrieve four instructions from memory sources such as Instruction Cache 402a-d, Fill Buffer 414, and a fill forward path from Memory 401.

The first number of instructions are stored in a first buffer (block 504). In the present embodiment, the four instructions are stored in Fetch Buffer 404 in respective buffer entries, buffers 0-3, depending on from which memory location each instruction was received. The four instructions are stored in received order, with the oldest instruction being stored in any of buffers 0-3. In various embodiments, the oldest of the four instructions may be identified by an additional value in Fetch Buffer 404, or all four instructions may be identified by their position in a program order. It is noted that the four instructions may be stored into Fetch Buffer 404 in parallel; a temporal order of storage is not implied.

Further operations of the method may depend on a determination whether the oldest instruction waiting for execution is in the first buffer or the second buffer (block 506). The four instructions stored in Fetch Buffer 404, in the present embodiment, may not include the oldest instruction waiting for execution. Instructions in Fetch Buffer 404 that are not selected to move into Decode Buffer 408 are stored in a second buffer, such as, e.g., Instruction Buffer 406. Instruction Buffer 406, therefore, may hold one or more instructions that are older than the oldest instruction in Fetch Buffer 404. If the oldest stored instruction is in Fetch Buffer 404, then the method moves to block 508 to identify an entry in Fetch Buffer 404 holding the oldest instruction. Otherwise, the method moves to block 510 to identify an entry in Instruction Buffer 406 holding the oldest instruction.

Upon determining that the oldest waiting instruction is in the first buffer, the entry holding the oldest waiting instruction is selected (block 508). In the present embodiment, the oldest waiting instruction in Fetch Buffer 404 may be identified by a flag or status bit in Fetch Buffer 404 set only for the entry holding the oldest instruction. Control Circuit 220 selects the oldest entry by setting control inputs to appropriate multiplexing circuits of MUXs 425*a-c* and 426*a-c* to route the oldest instruction from one of buffers 0-3 of Fetch Buffer 404 to one of entries 0-2 in Decode Buffer 408. The method moves to block 512 to determine if a second number of instructions have been identified.

Upon determining that the oldest waiting instruction is in the second buffer, the entry holding the oldest waiting instruction is selected (block 510). The oldest waiting instruction in Instruction Buffer 406, in the current embodiment, is identified and selected. Instruction Buffer 406 may output the three oldest instructions, in a predetermined order, either by default or in response to a command from Control Logic 220. Control Circuit 220 selects the oldest entry in Instruction Buffer 406 by setting control inputs to MUXs 326*a-c* to route the oldest instruction to the appropriate entry of entries 0-2 in Decode Buffer 308. The method moves to block 512 to determine if a second number of instructions have been identified.

Further operations of the method may depend upon a number of instructions selected (block 512). In the present embodiment, instructions are selected from the combination of Fetch Buffer 404 and Instruction Buffer 406 until the three oldest instructions are identified and selected. If less than three instructions are selected, then the method returns to block 506 to identify the next oldest instruction. Otherwise, the method moves to block 514 to move the selected instructions into Decode Buffer 408.

The three selected instructions are moved into the third buffer (block 514). The three instructions are routed from their identified entries in Fetch Buffer 404 and Instruction Buffer 406, via MUXs 425*a-c* and 426*a-c*, into Decode Buffer 408. The three instructions are stored in Decode Buffer 408 in program order, e.g., with the oldest instruction stored in entry 0 and the youngest of the three stored in entry 2. The method moves to block 516 to move the instructions remaining in Fetch Buffer 404 to Instruction Buffer 406.

Instructions remaining in the first buffer are moved into the second buffer (block 516). Since Decode Buffer 408 holds three instructions in the present embodiment, Fetch Buffer 404 will always have at least one instruction that needs to be further buffered in Instruction Buffer 406 before Fetch Buffer 404 may be used to fetch a new set of four instructions. Instructions in Fetch Buffer 404 that are not copied into Decode Buffer 408 are, therefore, copied into Instruction Buffer 406. Instruction Buffer 406 may include any suitable number of entries. The method ends in block 517.

It is noted that the method illustrated in FIG. 5 is merely an example for demonstration. Although the operations are shown to occur serially, some or all operations may be performed in parallel. For example, although blocks 506 through 514 imply a serial loop to select the three oldest instructions, in some embodiments, the three oldest instructions may be identified and copied into the third buffer in parallel. In some embodiments, additional operations may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a fetch buffer having a first set of ordered entries configured to store instructions, including instructions that are received out-of-order relative to a program order;
    a decode buffer having a second set of ordered entries that is fewer in number than the first set of ordered entries;
    an instruction buffer having a third set of ordered entries; and
    a control circuit configured to:
        place selected ones of the received out-of-order instructions into available entries of the fetch buffer, using a particular order that is different from the received order and different from the program order;
        fill, beginning with an initial available entry, all available entries in the second set of ordered entries of the decode buffer, wherein filling a given available entry includes moving an oldest instruction currently stored by either the fetch buffer or the instruction buffer, wherein the oldest instruction is determined with respect to program order; and
        after filling all available entries in the decode buffer, move remaining instructions stored in the fetch buffer to the third set of ordered entries in the instruction buffer.

2. The apparatus of claim 1, wherein the control circuit is further configured to arrange the remaining instructions in the third set of ordered entries based on the program order.

3. The apparatus of claim 1, wherein the control circuit is further configured to send instructions from the decode buffer to an execution unit based on the program order.

4. The apparatus of claim 1, wherein the control circuit is further configured to receive instructions from a plurality of memories.

5. The apparatus of claim 4, wherein a received order of the instructions that are received out-of-order is dependent upon a respective access time of each memory of the plurality of memories from which the instructions are received.

6. The apparatus of claim 4, wherein one memory of the plurality of memories is a fill buffer, and wherein the control circuit is further configured to receive an instruction from the fill buffer in response to a cache miss.

7. The apparatus of claim 4, wherein one memory of the plurality of memories is an instruction cache with a plurality of outputs, and wherein a particular output of the plurality of outputs is mapped to a particular one of the first set of ordered entries.

8. A method comprising:
receiving a plurality of instructions out-of-order relative to a program order;
storing selected ones of the received out-of-order instructions in a first set of ordered entries in a fetch buffer, wherein the plurality of instructions is arranged in the first set of ordered entries using a particular order that is different from the received order, and different from the program order;
filing, beginning with an initial available entry, all available entries in a second set of ordered entries of a decode buffer, wherein filling a given available entry includes moving an oldest instruction currently stored by either the fetch buffer or an instruction buffer, wherein the oldest instruction is determined with respect to program order; and
after filling all available entries in the decode buffer, move remaining instructions stored in the fetch buffer to the instruction buffer.

9. The method of claim 8, further comprising arranging the remaining instructions in a third set of ordered entries t dependent upon the program order.

10. The method of claim 8, wherein the first set of ordered entries is greater in number than the second set.

11. The method of claim 10, further comprising sending instructions from the decode buffer to an execution unit based on the program order.

12. The method of claim 8, further comprising receiving the plurality of instructions from a plurality of memories.

13. The method of claim 12, wherein the plurality of memories includes an instruction cache and a fill buffer, and further comprising receiving an instruction from the fill buffer in response to a miss in the instruction cache.

14. The method of claim 12, wherein the received order is dependent upon a respective access time of each memory of the plurality of memories from which each instruction of the plurality of instructions is received.

15. A system, comprising:
an instruction cache;
a scheduling unit, including a fetch buffer, an instruction buffer, and a decode buffer, wherein the scheduling unit is configured to:
receive a plurality of instructions out-of-order relative to a program order;
store selected ones of the received out-of-order instructions in a first set of ordered entries in the fetch buffer, wherein the plurality of instructions is arranged in the first set of ordered entries using a particular order that is different from the received order, and different from the program order;
fill, beginning with an initial available entry, all available entries in a second set of ordered entries of the decode buffer, wherein filling a given available entry includes moving an oldest instruction currently stored by either the fetch buffer or the instruction buffer, wherein the oldest instruction is determined with respect to program order; and
after filling all available entries in the decode buffer, move remaining instructions stored in the fetch buffer into a third set of ordered entries in the instruction buffer.

16. The system of claim 15, wherein the scheduling unit is further configured to arrange the remaining instructions in the third set of ordered entries based on the program order.

17. The system of claim 16, further comprising a memory, wherein the received order is dependent upon whether a given instruction of the plurality of instructions is received from the instruction cache or the memory.

18. The system of claim 15, further comprising a cache fill buffer, and wherein to receive the plurality of instructions, the scheduling unit is further configured to receive a subset of the plurality of instructions from the cache fill buffer.

19. The system of claim 15, wherein to store the plurality of instructions in the first set of ordered entries in the fetch buffer, the scheduling unit is further configured to set a respective value corresponding to each entry of the first set of ordered entries, wherein the respective value corresponds to the program order of a corresponding instruction stored in each entry of the first set of ordered entries.

20. The system of claim 15, wherein the received order is dependent upon a respective location in the instruction cache from which each instruction of the plurality of instructions is received.

* * * * *